US009690923B2

(12) United States Patent
Huang

(10) Patent No.: US 9,690,923 B2
(45) Date of Patent: Jun. 27, 2017

(54) METHOD, APPARATUS AND SYSTEM FOR VERIFYING TERMINAL

(71) Applicant: TENCENT TECHNOLOGY (SHENZHEN) COMPANY LIMITED, Shenzhen, Guangdong (CN)

(72) Inventor: Liang Huang, Shenzhen (CN)

(73) Assignee: Tencent Technology (Shenzhen) Company Limited, Shenzhen, Guangdong (CN)

( * ) Notice: Subject to any disclaimer, the term of this patent is extended or adjusted under 35 U.S.C. 154(b) by 0 days.

(21) Appl. No.: 15/035,424

(22) PCT Filed: Oct. 24, 2014

(86) PCT No.: PCT/CN2014/089404
§ 371 (c)(1),
(2) Date: May 9, 2016

(87) PCT Pub. No.: WO2015/074474
PCT Pub. Date: May 28, 2015

(65) Prior Publication Data
US 2016/0292411 A1    Oct. 6, 2016

(30) Foreign Application Priority Data
Nov. 19, 2013    (CN) .......................... 2013 1 0585392

(51) Int. Cl.
*G06F 21/36*    (2013.01)
*H04L 9/32*    (2006.01)
(Continued)

(52) U.S. Cl.
CPC ........ *G06F 21/36* (2013.01); *G06F 17/30268* (2013.01); *G06T 3/0093* (2013.01);
(Continued)

(58) Field of Classification Search
CPC ....................................................... G06F 21/36
See application file for complete search history.

(56) References Cited

U.S. PATENT DOCUMENTS 7,891,005 B1 *  2/2011  Baluja ..................... G06F 21/36
                                                           713/182
8,918,851 B1 * 12/2014  Iannamico ............. G06F 21/36
                                                             726/7
(Continued)

FOREIGN PATENT DOCUMENTS

| CN | 101388078 A | 3/2009 |
| CN | 102592254 A | 7/2012 |
| CN | 102724191 A | 10/2012 |

OTHER PUBLICATIONS

International Search Report and Written Opinion of the ISA for PCT/CN2014/089404, ISA/CN, Haidian District, Beijing, mailed Jan. 28, 2015.

*Primary Examiner* — Saleh Najjar
*Assistant Examiner* — Louis Teng
(74) *Attorney, Agent, or Firm* — Harness, Dickey & Pierce, P.L.C.

(57) ABSTRACT

The present invention relates to the technical field of computer technologies. Disclosed are a verification method, apparatus and system. The method comprises: responding to a verification request sent by a terminal, and randomly selecting an image combination from pre-generated multiple image combinations; merging images in the image combination according to a preset merging mode, processing a merged image according to a second processing mode, and generating a verification code; sending the verification code and a verification question associated with the image combination to the terminal; and receiving a verification result returned by the terminal, and performing verification according to the verification result, the terminal performing
(Continued)

image cutting on the verification code, the verification result being generated by the terminal according to a received verification answer, and the verification answer being selected from the cut verification code. The present invention improves the security.

12 Claims, 7 Drawing Sheets

(51) Int. Cl.

| | | |
|---|---|---|
| *G06F 17/30* | (2006.01) | |
| *G06T 3/00* | (2006.01) | |
| *G06T 3/40* | (2006.01) | |
| *G06T 3/60* | (2006.01) | |
| *G06T 11/60* | (2006.01) | |
| *H04L 29/06* | (2006.01) | |
| *G06T 11/00* | (2006.01) | |

(52) U.S. Cl.
CPC ............... *G06T 3/40* (2013.01); *G06T 3/60* (2013.01); *G06T 11/001* (2013.01); *G06T 11/60* (2013.01); *H04L 9/3226* (2013.01); *H04L 63/08* (2013.01); *H04L 63/123* (2013.01)

(56) References Cited

U.S. PATENT DOCUMENTS

| | | | | |
|---|---|---|---|---|
| 2007/0201745 | A1* | 8/2007 | Wang | G06K 9/00 382/181 |
| 2010/0325706 | A1* | 12/2010 | Hachey | H04L 9/3271 726/6 |
| 2012/0323700 | A1* | 12/2012 | Aleksandrovich | G06Q 30/00 705/14.69 |
| 2015/0067825 | A1* | 3/2015 | Mese | G06F 21/36 726/19 |

\* cited by examiner

ID, APPARATUS AND SYSTEM FOR
VERIFYING TERMINAL

The present application is the national phase of International Application No. PCT/CN2014/089404, titled "VERIFICATION METHOD, APPARATUS AND SYSTEM", filed on Oct. 24, 2014, which claims priority to Chinese Patent Application No. 201310585392.8 titled "METHOD, DEVICE AND SYSTEM FOR VERIFYING TERMINAL" and filed with the Chinese State Intellectual Property Office on Nov. 19, 2013, each of which is incorporated herein by reference in its entirety.

FIELD

The present disclosure relates to the field of computer technology, and particularly to a verification method, a verification apparatus and a verification system.

BACKGROUND

The verification code is a mechanism for effectively verifying whether a visit request is sent by a computer or a human being, which can prevent malicious visit requests launched through a terminal to a server, such as malicious crack of passwords, repeated voting and spamming in forums, effectively improving the network security of the server. In a current verification code mechanism, a verification question and a verification code corresponding to the verification question are sent to a terminal, where the verification code includes multiple images corresponding to the verification question, for a user to select image(s) in the verification code in response to the verification question and return, as a result, to the server, so that the server can run statistics on the returned result and determine whether the result passes the verification.

Conventionally, the process of generating a verification code corresponding to a verification question includes the following: storing related images corresponding to each verification question in a server, where the images include images with label of "yes", i.e., the correct answer to the verification question, and images with label of "no", i.e., wrong answers to the verification question; and pre-selecting, by the server, a predetermined number of images to be a verification code, where the images as selected include at least one image carrying the correct answer, and recording information of a position of the correct answer in the verification code. When opening a webpage with a verification code, a terminal will send multiple requests to the server for drawing verification codes. The server randomly selects a verification code from generated in advance verification codes, sends the verification code and a verification question to the terminal, and determines, based on pre-stored information of the position, whether the verification for the verification code is passed when the terminal returns a result.

There is a need for a secure, fast and low-overhead verification method in the field.

SUMMARY

To solve the problem in conventional technology, a verification method, a verification apparatus and a verification system are provided according to the present disclosure.

In an aspect, a verification method is provided, which includes:

randomly selecting, in response to a verification request sent by a terminal, an image group from multiple image groups generated in advance, where images in the image groups are associated with a same verification question;

generating a verification code by merging the images in the selected image group in a preset merging manner and performing image processing in a second processing manner on the merged image;

sending the verification code and the verification question associated with the image group to the terminal, where a segmentation is performed on the verification code by the terminal; and receiving a result returned by the terminal and performing a verification based on the result, where the result is generated by the terminal based on a received verification answer, where the verification answer is selected from the segmented verification code.

In another aspect, a verification apparatus is provided, which includes:

a selecting module, configured to select, in response to a verification request sent by a terminal, an image group from multiple image groups generated in advance, where images in the image groups are associated with a same verification question;

a first generating module, configured to generate a verification code by merging the images in the selected image group in a preset merging manner and performing image processing in a second processing manner on the merged image; and a verifying module, configured to send the verification code and the verification question associated with the image group to the terminal, receive a result returned by the terminal and perform a verification based on the result, where a segmentation is performed on the verification code by the terminal and the result is generated by the terminal based on a received verification answer, where the verification answer is selected from the segmented verification code.

In another aspect, a verification method is provided, which includes:

randomly selecting, by a server, an image group from multiple image groups generated in advance, where images in the image groups are associated with a same verification question, generating a verification code by merging the images in the selected image group in a preset merging manner and performing image processing in a second processing manner on the merged image, and sending the verification code and the verification question associated with the image group to a terminal;

performing, by the terminal, a segmentation on the verification code, displaying the segmented verification code and the verification question, receiving a verification answer selected based on the segmented verification code, generating a result based on the verification answer and returning the result to the server; and receiving, by the server, the result returned by the terminal and performing a verification based on the result.

In another aspect, a verification system is provided, which includes a terminal and a server, where the server is configured to randomly select, in response to a verification request sent by a terminal, an image group from multiple image groups generated in advance, where images in the image groups are associated with a same verification question, generate a verification code by merging the images in the selected image group in a preset merging manner and performing image processing in a second processing manner on the merged image, send the verification code and the verification question associated with the image group to the terminal, receive a result returned by the terminal and perform a verification based on the result; and the terminal is configured to perform a segmentation on the verification code, display the segmented verification code and the verification question, receive a verification answer selected based on the segmented verification code, generate a result based on the verification answer and return the result to the server.

By randomly selecting the image group in response to the verification request sent by the terminal, performing image processing on the images in the image group, merging the images into one composite image to generate the verification code, returning the verification code to the terminal and performing a verification based on the result returned by the terminal, the disadvantage that, someone may attack a server by repeatedly submitting results by taking advantage of the lifetime of a verification code in the server, is remedied, improving the security of the server.

BRIEF DESCRIPTION OF THE DRAWINGS

The drawings to be used in the descriptions of embodiments are described briefly as follows, so that technical solutions according to the embodiments of the invention may become clearer. Apparently, the drawings in the following descriptions only illustrate some embodiments of the invention. For those in the art, other drawings may be obtained based on these drawings without any creative work.

DETAILED DESCRIPTION

Technical solutions according to embodiments of the invention are described clearly and completely hereinafter in conjunction with the drawings, so that the objective, technical solutions and advantages of the invention can be clearer.

Used here, verification code is a mechanism for telling humans and machines apart, which, for example, includes CAPTCHA (Completely automated public turing test to tell computers and humans apart) verification code. The verification code may take a variety of forms, such as one or more images, characters, symbols or any combination thereof.

First Embodiment

Figure 1:
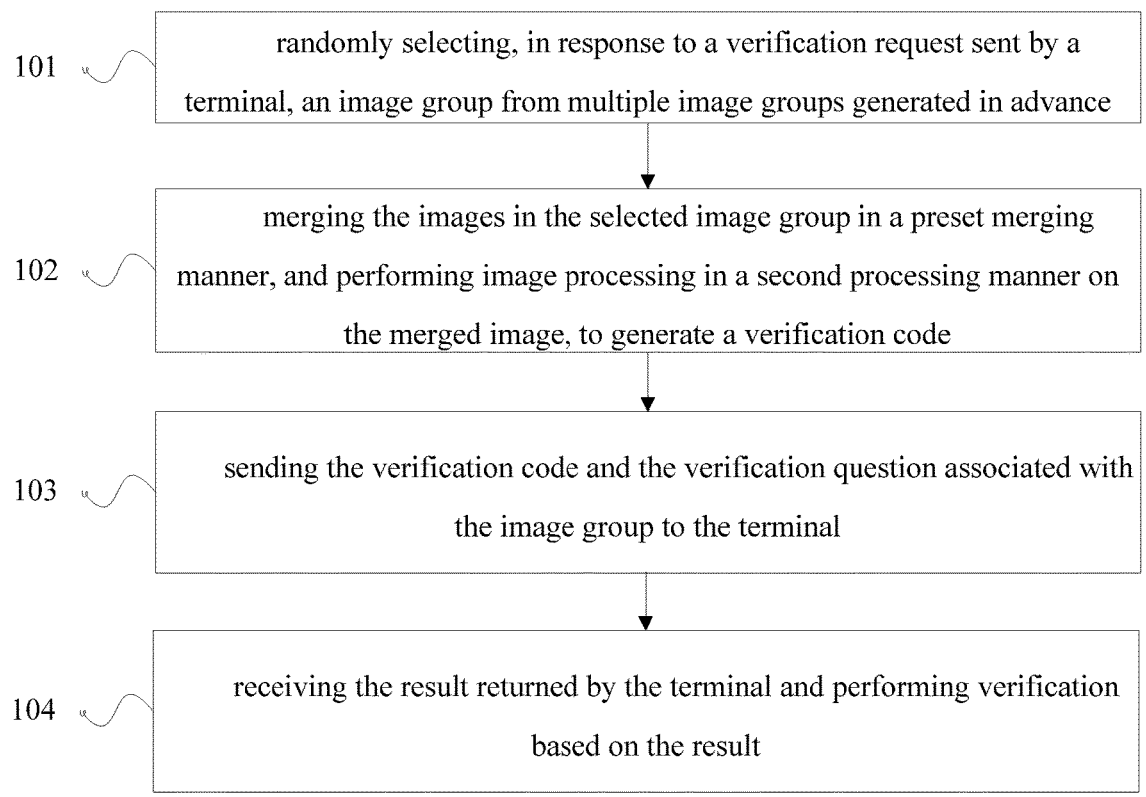
FIG. 1 is a flowchart of a verification method according to a first embodiment of the invention.

A verification method is provided according to the embodiment of the invention, which, as shown in FIG. 1, includes steps 101 to 104.

Step 101: randomly selecting, in response to a verification request sent by a terminal, an image group from multiple image groups generated in advance, where images in the image groups are associated with a same verification question.

Step 102: merging the images in the selected image group in a preset merging manner, and performing image processing in a second processing manner on the merged image, to generate a verification code.

Step 103: sending the verification code and the verification question associated with the image group to the terminal.

The terminal performs segmentation on the verification code, and generates a result based on a received verification answer, where the verification answer is selected from the segmented verification code.

For example, the verification answer may be selected by a user from the verification code which is divided into multiple images, or the verification answer may be selected by an attacker from the divided verification code through malicious codes or in other ways.

Step 104: receiving the result returned by the terminal and performing verification based on the result.

In the embodiment of the invention, by randomly selecting the image group in response to the verification request sent by the terminal, performing image processing on the images in the image group, merging the images into one composite image to generate the verification code, returning the verification code to the terminal and performing a verification based on the result returned by the terminal, the disadvantage that someone may attack a server by repeatedly submitting results by taking advantage of the lifetime of a verification code in the server is remedied, improving the security of the server.

Second Embodiment

Figure 2:
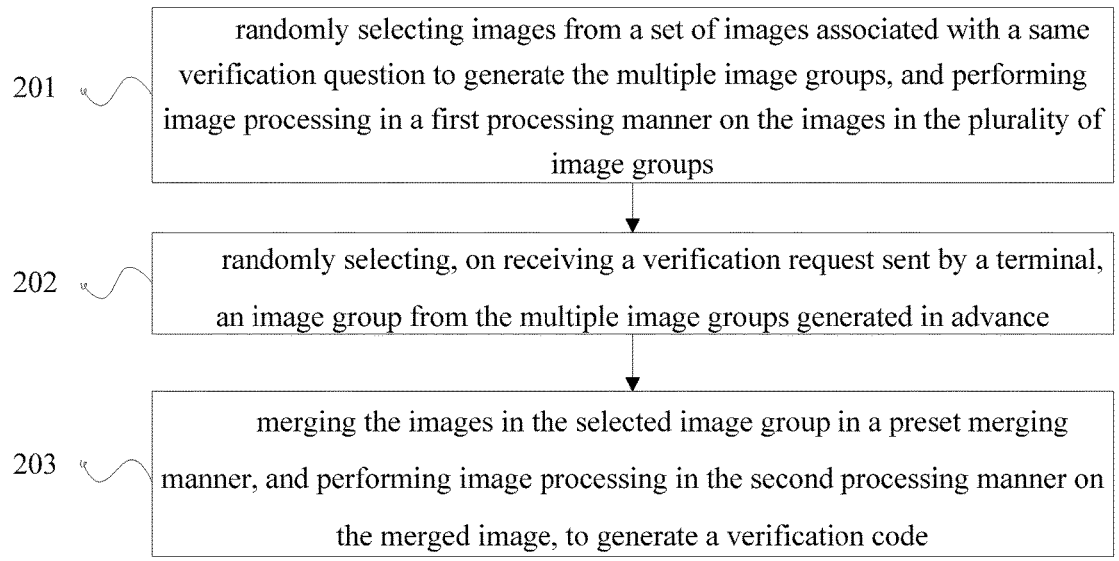
FIG. 2 is a flowchart of generating a verification code in a verification method according to a second embodiment of the invention.

A method for generating a verification code in a verification method is provided according the embodiment of the invention, which, as shown in FIG. 2, includes step 201 to 203.

Step 201: randomly selecting images from a set of images associated with a same verification question to generate the multiple image groups, and performing image processing in a first processing manner on the images in the plurality of image groups.

In a server, each verification question corresponds to a set of images. The set of images includes images with label of "yes", i.e., the correct answer to the verification question, and images with label of "no", i.e., wrong answers to the verification question. The set of images is stored in a first buffer corresponding to the verification question.

In the set of images, images are randomly selected to generate the multiple image groups, to serve as candidate image groups for generating a verification code. It should be ensured that each image group includes at least a predetermined number of images with label of "yes", i.e., images serving as the correct answer to the verification question. The number of images selected for each group may be predetermined, to serve as a condition for generating an image group.

In some scenarios, an image group for generating a verification code is required to meet a lot of requirements, for example, existence of at least X images with label of "yes", and existence of at least Y images with label of "no", where X and Y may even be ranges rather than values, and how many images with label of "yes" and "no" are selected and how to select are not limited herein.

The first processing manner may include other ways for processing images, which is not limited herein.

Further, the process of selecting images from the set of images to generate the multiple image groups is described with an example. For example, there are 1,000,000 images in a set corresponding to a verification question, 20,000 image groups are to be generated, and each of the image groups includes 9 images.

An image in the set of images may be included in multiple image groups.

Further, after the images are selected and the multiple image groups are generated, first image processing is to be performed on images in each of the multiple image groups by the first processing manner, and after the first image processing is performed, the images in each of the multiple image groups are different from original images in the set of images.

The first processing manner may include, but not limited to, at least of the following:
adding interference lines, adding interference points, adding interference polygons, changing colors, changing a contrast, rotating an image, stretching an image, twisting an image, cutting an image, blocking an image and performing a perspective transformation on an image.

Figure 3:
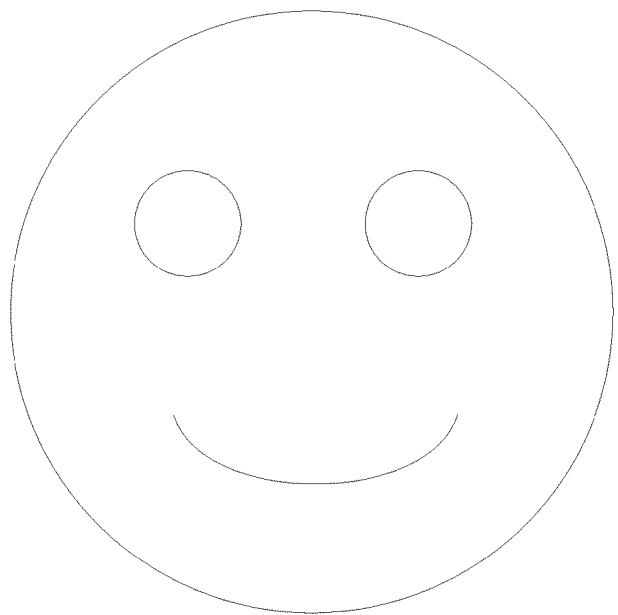
FIG. 3 is a schematic diagram of generating an image in a set of images when generating a verification code in the verification method according to the second embodiment of the invention.
Figure 4:
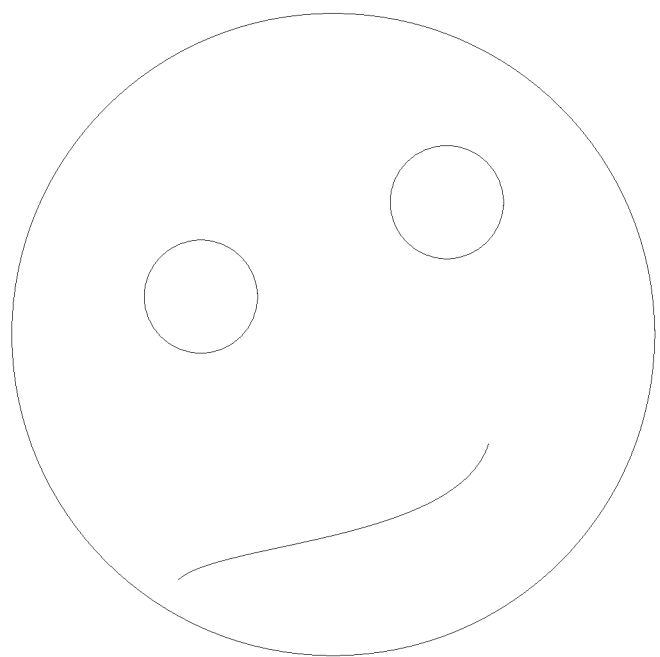
FIG. 4 is a schematic diagram of twisting an image in a set of images when generating a verification code in the verification method according to the second embodiment of the invention.
Figure 5:
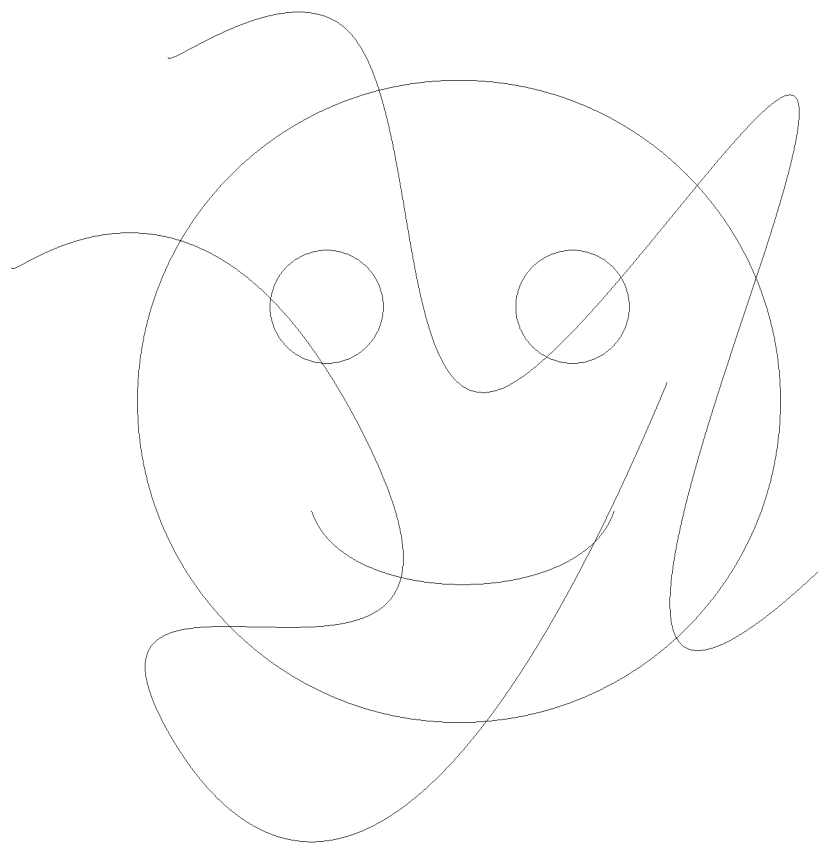
FIG. 5 is a schematic diagram of adding interference lines to an image in a set of images when generating a verification code in the verification method according to the second embodiment of the invention.

For example, FIG. 3 is a schematic diagram of an image in the set of images, FIG. 4 is a schematic diagram of an image obtained through twisting the image in FIG. 3, and FIG. 5 is a schematic diagram of an image obtained through adding interference lines to the image in FIG. 3.

Since the first image processing in step 201 on the multiple image groups is not directly for the purpose of generating a verification code, a change rate in processing the images by the first processing manner is larger than a change rate in processing the images in a second processing manner. Thus, time spent on processing each image in the first image processing is longer than time spent on processing each image in a second image processing.

After the first image processing is performed on the images in each of the multiple image groups, all the multiple image groups are stored in a second buffer corresponding to the verification question.

Step 202: randomly selecting, in response to a verification request sent by a terminal, an image group from the multiple image groups generated in advance, where images in the image groups are associated with a same verification question Step 203: merging the images in the selected image group in a preset merging manner, and performing image processing in the second processing manner on the merged image, to generate a verification code.

In the process of generating the verification code, an image group can be arbitrarily selected from the multiple image groups stored in the second buffer, and images in the selected image group can be merged in a preset merging manner.

The preset merging manner may include, but not limited to, the following:
arranging the images in a row in the horizontal direction;
arranging the images in a column in the vertical direction; and
setting the number of images in each row, and setting the number of images in each column.

After an image is obtained through merging, the second image processing is performed in the second processing manner.

The second processing manner may include, but not limited to, at least of the following:
adding interference lines, adding interference points, adding interference polygons, changing colors, changing a contrast, rotating an image, stretching an image, twisting an image, cutting an image, blocking an image and performing a perspective transformation on an image.

The second processing manner may further include other ways for processing images, which is not limited herein.

Specifically, since image processing is performed on the images in a preset set of images corresponding to each verification question, resolutions or sizes of the images are the same, so that there is no need to adjust the resolutions or sizes of the images during the merging operation for generating the verification code. Besides, the resolutions or sizes of the images for generating the verification code and the number of the images for generating the verification code can be carried in webpage codes including the verification code, so that the terminal can know the resolutions or sizes of the images in the verification code. Further, the images are merged in preset manner for generating the verification code. For example, assuming that the verification code is generated with 9 images, the 9 images are merged into a nine-rectangle-grid. The merging manner may be carried, in the form of a merging identifier, in webpage codes with the verification code opened by a user, and when the user opens the webpage and obtains the verification code, the terminal determines how to perform segmentation according to the merging identifier.

The change rate in processing the images by the first processing manner is larger than the change rate in processing the images by the second processing manner.

Since the second image processing is for generating the verification code and this step, probably triggered in response to the verification request sent by the terminal, is with limited time and requires quick image processing, the change rate in processing the images by the second processing manner is smaller than the change rate in processing the images by the first processing manner.

After the second image processing is performed on the images, the resultant image is determined to be the verification code. A unique verification code identifier is dispatched to correspond to the verification code and is associated with the verification code. The association may be achieved by storing a correspondence relation between the verification code and the verification code identifier corresponding to the verification code, and storing the verification code identifier in the verification code, whereby the verification code identifier is stored in a result returned after sending the verification code to the terminal, so that the server can analyze whether an answer in the result passes the verification based on the verification code identifier.

The verification code generated here is stored in a third buffer corresponding to the verification question.

Figure 6:
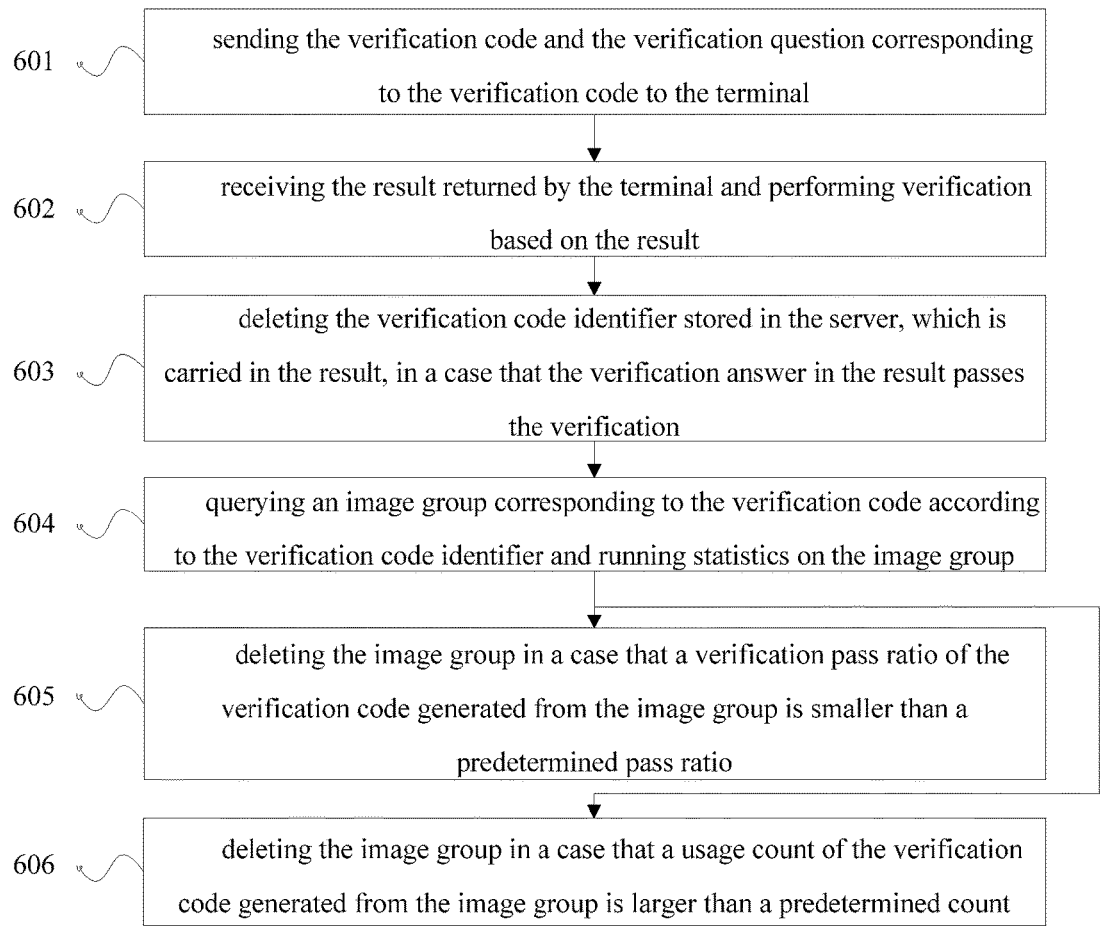
FIG. 6 is a flowchart of performing a verification based on a generated verification code according to the second embodiment of the invention.

A process for performing a verification based on the verification code generated when verifying the terminal is provided according to an embodiment of the invention, which, as shown in FIG. 6, includes steps 601 to 606.

Step 601: sending the verification code and the verification question corresponding to the image group to the terminal.

And, the processing at the terminal includes the following:

receiving the verification code and the verification question sent by the server, and performing segmentation on the verification code;

obtaining a verification answer selected by a user based on the segmented verification code; and returning the verification answer and the verification code identifier corresponding to the verification code as a result to the server, for the server to perform a verification based on the result.

After receiving the verification code, the terminal segments the verification code in multiple images from which the user can select the verification answer, and sends the verification answer as selected and the verification code identifier corresponding to the verification code as the result to the server.

For the terminal, the image segmentation is a restoration with respect to the merging operation in step 203. When opening a webpage including the verification code, the terminal will determine the resolutions or sizes of the images in the verification code, the number of the images for generating the verification code and the merging identifier. When performing the image segmentation, the terminal determines how to perform the image segmentation on the verification code according to the merging identifier, and determines where to perform the image segmentation in the verification code based on a resolution or size of the verification code and the number of the images for generating the verification code. For example, if a merging manner of the verification code represented by the merging identifier is arranging the images in a row in the horizontal direction, in this case the segmentation manner is determined as vertical segmentation, and how many times the segmentation is performed is determined based on the number of the images for generating the verification code, and a side of each vertical segmentation is further determined based on a resolution or size of each of the images in the verification code.

In this way, it is ensured that through the image segmentation, each verification code can be correctly restored to the images before being segmented. Further, it is ensured that the user can select the correct verification answer from the segmented verification code.

Step 602: receiving the result returned by the terminal and performing verification based on the result.

The verification answer and the verification code identifier corresponding to the verification code are carried in the result. The verification process is performed according to conventional technology, which is not described here redundantly.

Step 603: deleting the verification code identifier stored in the server, which is carried in the result, in a case that the verification answer in the result passes the verification.

The server deletes the verification code identifier after the verification is passed, to ensure that the verification code can only be used once and will not be cracked by others. In this case, if a hacker cracks the verification code sent from the server at the terminal, extracts the verification code identifier from the verification code, obtains the answer to the verification code and sends the result to the server, the server can not find the verification code identifier in the result and therefore can not complete the verification, thus the hacker can not attack the server.

Further, after the verification code identifier is deleted, the verification code corresponding to the verification code identifier may also be deleted, to reduce a storage pressure for the server.

Preferably, in a case that the verification is not passed, the verification code may be reused or deleted. In a case that the verification is not passed, whether the verification will be reused is not limited herein.

Besides, after step 603, statistics may be run on the verification process and an optimization may be performed on image groups. Thus, after step 603, the method further includes steps 604 to 606.

Step 604: querying an image group corresponding to the verification code according to the verification code identifier and running statistics on the image group.

For example, for a verification code identifier which passes the verification, a verification pass count of an image group to which the verification code corresponding to the verification code identifier belongs is increased by one. In this case a verification pass ratio of the image group is increased, otherwise the ratio is reduced. By running statistics on the verification pass ratio, it can be determined whether images in the image group are suitable for the verification connected to the verification question. A low verification pass ratio indicates the image group is not suitable for the verification corresponding to the verification question, and the image group should be deleted.

Or, a usage count of the images in the image group to which the verification code corresponding to the verification code identifier belongs may be increased by one after the verification. By running statistics on the usage count, a usage frequency of the image group can be determined. For an image group with a high usage frequency, the image group is deleted for security considerations. Thus, after running the statistics, steps 604 and 605 are required to be performed in a case that the two following conditions are met.

Step 605: deleting the image group in a case that a verification pass ratio of the verification code generated from the image group is smaller than a predetermined pass ratio.

Step 606: deleting the image group in a case that a usage count of the verification code generated from the image group is larger than a predetermined count.

In the embodiment of the invention, by randomly selecting the image group in response to the verification request sent by the terminal, performing image processing on the images in the image group, merging the images into one composite image to generate the verification code, returning the verification code to the terminal and performing a verification based on the result returned by the terminal, the disadvantage that, someone may attack a server by repeatedly submitting results by taking advantage of the lifetime of a verification code in the server, is remedied, improving the security of the server.

Besides, since a merging operation is performed in the server on the images in the verification code, the server does not need to send multiple images in response to multiple received drawing requests, which reduces the pressure on the server.

Further, image processing is performed in generating the image groups and is further performed in the process of generating the verification code with the image groups, therefore the numbers of the generated image groups and verification codes are greatly increased and the finally generated verification codes rarely duplicate, which thus further improves the security of the server.

Third Embodiment

Figure 7:
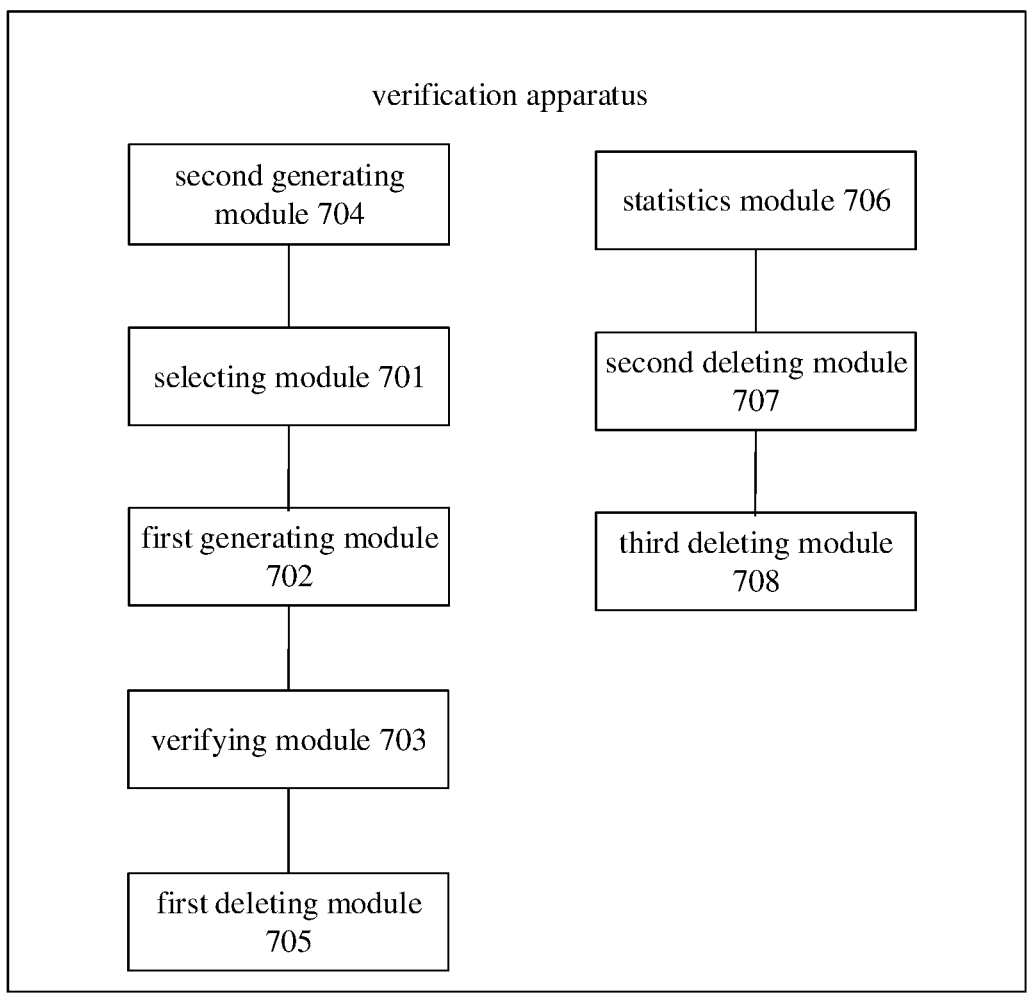
FIG. 7 is a structural diagram of a verification apparatus according to a third embodiment of the invention.

A verification apparatus is provided according to the embodiment of the invention, which, as shown in FIG. 7, includes:

a selecting module 701, configured to select, in response to a verification request sent by a terminal, an image group from multiple image groups generated in advance, where images in the image groups are associated with a same verification question;

a first generating module 702, configured to generate a verification code by merging the images in the selected image group in a preset merging manner and performing image processing in a second processing manner on the merged image; and a verifying module 703, configured to send the verification code and the verification question associated with the image group to the terminal, receive a result returned by the terminal and perform a verification based on the result, where a segmentation is performed on the verification code by the terminal and the result is generated by the terminal based on a received verification answer, the verification answer is selected from the segmented verification code.

The verification apparatus further includes:

a second generating module 704, configured to randomly select images from a set of images associated with a same verification question to generate the multiple image groups, and perform image processing in a first processing manner on the images in the plurality of image groups.

A change rate in processing the images by the first processing manner is larger than a change rate in processing the images by the second processing manner.

Each of the multiple image groups includes a preset quantity of images serving as correct answer to the verification question.

The first processing manner and the second processing manner include at least one of adding interference lines, adding interference points, adding interference polygons, changing colors, changing a contrast, rotating an image, stretching an image, twisting an image, cutting an image, blocking an image and performing a perspective transformation on an image.

The verification apparatus further includes:

a first deleting module 705, configured to delete the verification code identifier stored in the verification apparatus, which is carried in the result, in a case that the verification answer in the result passes the verification.

The verification apparatus further includes:

a statistics module 706, configured to query an image group corresponding to the verification code according to the verification code identifier and run statistics on the image group;

a second deleting module 707, configured to delete the image group in a case that a verification pass ratio of the verification code generated from the image group is smaller than a predetermined pass ratio; and a third deleting module 708, configured to delete the image group in a case that a usage count of the verification code generated from the image group is larger than a predetermined count.

In the embodiment of the invention, by randomly selecting the image group in response to the verification request sent by the terminal, performing image processing on images in the image group, merging the images into one composite image to generate the verification code, returning the verification code to the terminal and performing a verification based on the result returned by the terminal, the disadvantage that someone may attack a server by repeatedly submitting results by taking advantage of the lifetime of a verification code in the server is remedied, improving the security of the server.

Besides, since a merging operation is performed in the server on the images for the verification code, the server does not need to receive multiple drawing requests and send multiple images in response to the multiple drawing requests, which reduces the pressure on the server.

Further, since image processing is performed in generating the image groups and is further performed in the process of generating the verification code with the image groups, the numbers of the generated image groups and verification codes are greatly increased and the finally generated verification codes rarely duplicate, which thus further improves the security of the server.

Fourth Embodiment

Figure 8:
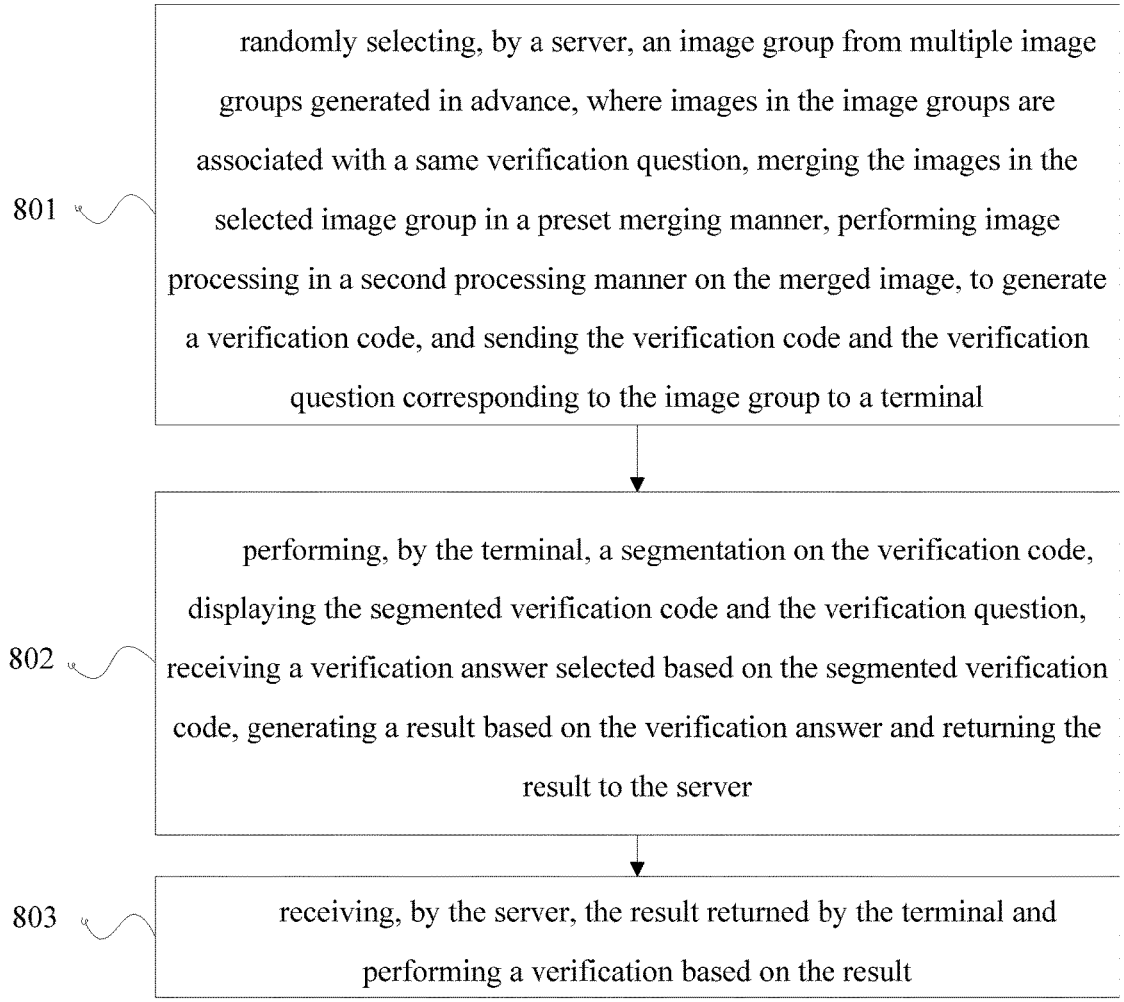
FIG. 8 is a flowchart of a verification method according to a fourth embodiment of the invention.

A method for generating a verification code in a verification method is provided according the embodiment of the invention, which, as shown in FIG. 8, includes:

step 801, randomly selecting, by a server, an image group from multiple image groups generated in advance, where images in the image groups are associated with a same verification question, merging the images in the selected image group in a preset merging manner, performing image processing in a second processing manner on the merged image, to generate a verification code, and sending the verification code and the verification question associated with the image group to a terminal;

step 802, performing, by the terminal, a segmentation on the verification code, displaying the segmented verification code and the verification question, receiving a verification answer selected based on the segmented verification code, generating a result based on the verification answer and returning the result to the server; and step 803, receiving, by the server, the result returned by the terminal and performing a verification based on the result.

Preferably, before the server receives the verification request sent by the terminal, the method further includes:

randomly selecting, by the server, images from a set of images associated with a same verification question to generate the multiple image groups, and performing image processing in a first processing manner on the images in the plurality of image groups.

A change rate in processing the images by the first processing manner is larger than a change rate in processing the images by the second processing manner.

Preferably, there are at least a predetermined number of images serving as the correct answer to the verification question in each of the multiple image groups.

Preferably, the first processing manner and the second processing manner each include at least one of adding interference lines, adding interference points, adding interference polygons, changing colors, changing a contrast, rotating an image, stretching an image, twisting an image, cutting an image, blocking an image and performing a perspective transformation on an image.

Preferably, after the server performs the verification based on the result, the method further includes:

deleting, by the server, the verification code identifier stored in the server, which is carried in the result, in a case that the verification answer in the result passes the verification.

Preferably, after the server performs the verification based on the result, the method further includes:

querying, by the server, an image group corresponding to the verification code according to the verification code identifier and running statistics on the image group;

deleting, by the server, the image group in a case that a verification pass ratio of the verification code generated from the image group is smaller than a predetermined pass ratio; and deleting, by the server, the image group in a case that a usage count of the verification code generated from the image group is larger than a predetermined count.

In the embodiment of the invention, by randomly selecting the image group in response to the verification request sent by the terminal, performing image processing on images in the image group, merging the images into one composite image to generate the verification code, returning the verification code to the terminal and performing a verification based on the result returned by the terminal, the disadvantage that someone may attack a server by repeatedly submitting results by taking advantage of the lifetime of a verification code in the server is remedied, improving the security of the server.

Besides, since a merging operation is performed in the server on the images in the verification code, the server does not need to receive multiple drawing requests and send multiple images in response to the multiple drawing requests, which reduces the pressure on the server.

Further, image processing is performed in generating the image groups and is further performed in the process of generating the verification code with the image groups, therefore the numbers of the generated image groups and verification codes are greatly increased and the finally generated verification codes rarely duplicate, which thus further improves the security of the server.

Fifth Embodiment

Figure 9:
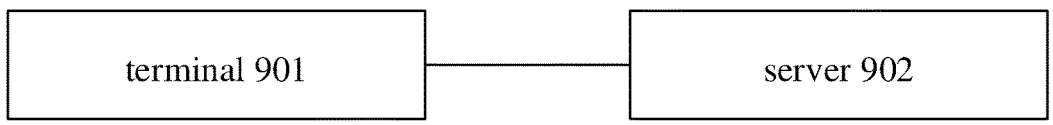
FIG. 9 is a structural diagram of a verification system according to a fifth embodiment of the invention.

A verification system is provided according to the embodiment of the invention, which, as shown in FIG. 9, includes:

a terminal 901 and a server 902.

The server 902 is configured to randomly select an image group from multiple image groups generated in advance, where images in the image groups are associated with a same verification question, merge the images in the selected image group in a preset merging manner, perform image processing in a second processing manner on the merged image, to generate a verification code, send the verification code and the verification question associated with the image group to the terminal 901, receive a result returned by the terminal 901 and perform a verification based on the result.

The terminal 901 is configured to perform a segmentation on the verification code, display the segmented verification code and the verification question, receive a verification answer selected based on the segmented verification code, generate a result based on the verification answer and return the result to the server 902.

The server 902 is further configured to randomly select images from a set of images associated with a same verification question to generate the multiple image groups, and perform image processing in a first processing manner on the images in the plurality of image groups.

A change rate in processing the images by the first processing manner is larger than a change rate in processing the images by the second processing manner.

There are at least a predetermined number of images serving as the correct answer to the verification question in each of the multiple image groups.

The first processing manner and the second processing manner each include at least one of adding interference lines, adding interference points, adding interference polygons, changing colors, changing a contrast, rotating an image, stretching an image, twisting an image, cutting an image, blocking an image and performing a perspective transformation on an image.

The server 902 is further configured to delete the verification code identifier stored in the server, which is carried in the result, in a case that the verification answer in the result passes the verification.

The server 902 is further configured to: query an image group corresponding to the verification code according to the verification code identifier and running statistics on the image group; delete the image group in a case that a verification pass ratio of the verification code generated from the image group is smaller than a predetermined pass ratio; and delete the image group in a case that a usage count of the verification code generated from the image group is larger than a predetermined count.

In the embodiment of the invention, by randomly selecting the image group in response to the verification request sent by the terminal, performing image processing on images in the image group, merging the images into one composite image to generate the verification code, returning the verification code to the terminal and performing a verification based on the result returned by the terminal, the disadvantage that someone may attack a server by repeatedly submitting results by taking advantage of the lifetime of a verification code in the server is remedied, improving the security of the server.

Besides, since a merging operation is performed in the server on the images in the verification code, the server does not need to receive multiple drawing requests and send multiple images in response to the multiple drawing requests, which reduces the pressure on the server.

Further, image processing is performed in generating the image groups and is further performed in the process of generating the verification code with the image groups, therefore the numbers of the generated image groups and verification codes are greatly increased and the finally generated the verification codes rarely duplicate, which thus further improves the security of the server.

Figure 10:
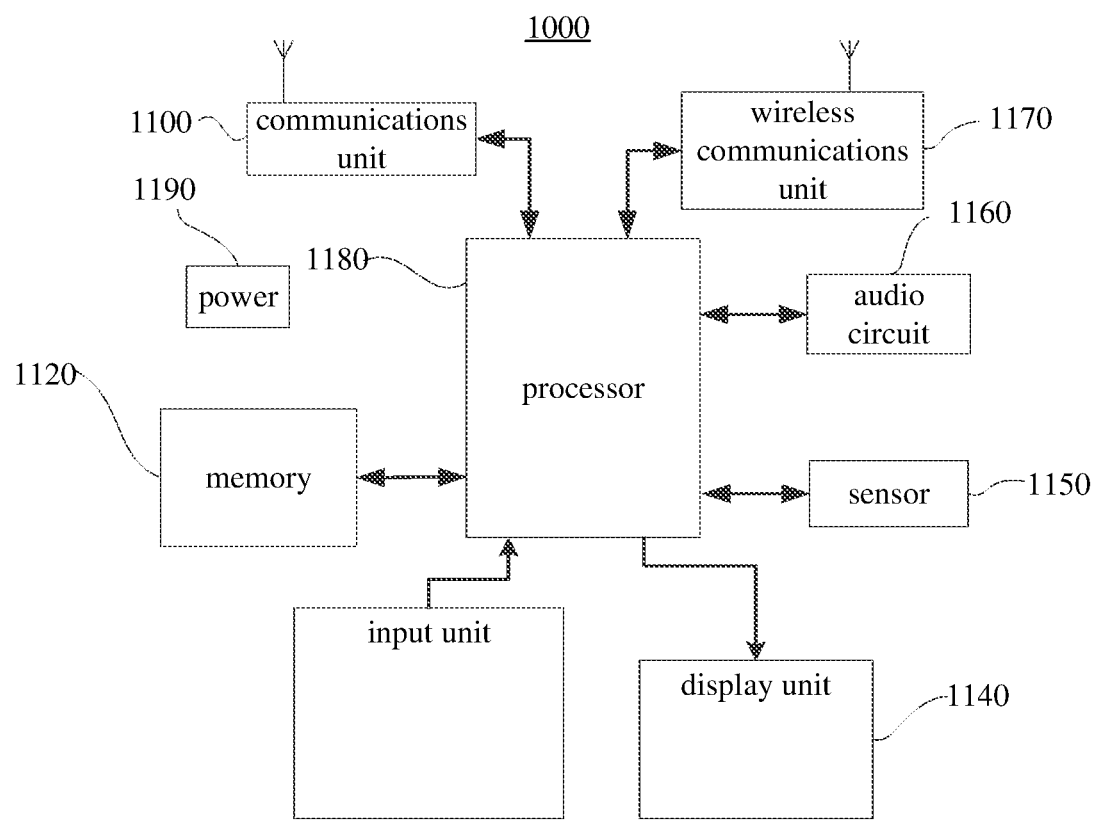
FIG. 10 is a hardware structural diagram of a verification apparatus according to an embodiment of the invention.

FIG. 10 is a hardware structural diagram of a verification apparatus according to an embodiment of the invention. The verification apparatus 1000 may include a communications unit 1110, a memory 1120 including one or more computer readable storage media, an input unit 1130, a display unit 1140, a sensor 1150, an audio circuit 1160, a WiFi (wireless fidelity) module 1170, a processor 1180 including one or more processing cores and a power supply 1190. Those skilled in the art shall understand that the terminal device is not limited to the structure shown in FIG. 10, and may include more or less components than those shown in the drawing, or may include combination of some of the components, or have a different component arrangement.

The verification apparatus 1000 further includes a memory and one or more programs. The one or more programs are stored in the memory, and configured to be executed by one or more processors with instructions for performing the following operations: randomly selecting, in response to a verification request sent by a terminal, an image group from multiple image groups generated in advance, where images in the image groups are associated with a same verification question; merging the images in the selected image group in a preset merging manner, and performing image processing in a second processing manner on the merged image, to generate a verification code; and sending the verification code and the verification question associated with the image group to the terminal, receiving a result returned by the terminal and performing a verification based on the result, where a segmentation is performed on the verification code by the terminal and the result is generated by the terminal based on a received verification answer, the verification answer is selected from the segmented verification code.

The numbering of the embodiments in the present disclosure are only used for description, rather than representing merits of the embodiments.

Those skilled in the art can understand that a part or all of the steps in the above embodiments may be performed by hardware, or performed by related hardware under instructions of a program. The program may be stored in a computer readable storage medium, which may be a read-only memory, a magnetic disk or an optical disc.

The embodiments above are only some preferred embodiments of the invention, and are not intended to limit the invention. Any modification, equivalent substitution or improvement made within the spirit and principle of the disclosure shall fall within the scope of the disclosure.

The invention claimed is:

1. A verification method comprising:
randomly selecting, in response to a verification request sent by a terminal, an image group from a plurality of image groups generated in advance, wherein images in the image groups are associated with a same verification question;
generating a verification code by merging the images in the selected image group in a preset merging manner, and performing image processing in a second processing manner on the merged image;
sending the verification code and the verification question associated with the selected image group to the terminal, wherein a segmentation is performed on the verification code by the terminal; and
receiving a result returned by the terminal and performing a verification based on the result, wherein the result is generated by the terminal based on a received verification answer, and the verification answer is selected from the segmented verification coder;
wherein after performing the verification based on the result, the method further comprising:
deleting a stored verification code identifier, which is carried in the result, in a case that the verification answer in the result passes the verification;
querying an image group corresponding to the verification code according to the verification code identifier and running statistics on the image group;
deleting the image group in a case that a verification pass ratio of the verification code generated from the image group is smaller than a predetermined pass ratio; and
deleting the image group in a case that a usage count of the verification code generated from the image group is larger than a predetermined count.

2. The method according to claim 1, before receiving the verification request sent by the terminal, further comprising:
randomly selecting images from a set of images associated with a same verification question to generate the plurality of image groups, and performing image processing in a first processing manner on the images in the plurality of image groups,
wherein the number of times the images are changed in processing the images by the first processing manner is larger than the number of times the images are changed in processing the images by the second processing manner.

3. The method according to claim 2, wherein each of the plurality of image groups comprises a preset quantity of images serving as correct answer to the verification question.

4. The method according to claim 2, wherein the first processing manner or the second processing manner comprises at least one of adding interference lines, adding interference points, adding interference polygons, changing colors, changing contrast, rotating an image, stretching an image, twisting an image, cutting an image, blocking an image and performing a perspective transformation on an image.

5. A verification apparatus, comprising:
one or more processors;
a memory storing program instructions, that when executed by the one or more processors, configure the system to:
select, in response to a verification request sent by a terminal, an image group from a plurality of image groups generated in advance, wherein images in the image groups are associated with a same verification question;
generate a verification code by merging the images in the selected image group in a preset merging manner and performing image processing in a second processing manner on the merged image; and
send the verification code and the verification question associated with the image group to the terminal, receive a result returned by the terminal and perform a verification based on the result, wherein a segmentation is performed on the verification code by the terminal and the result is generated by the terminal based on a received verification answer, and the verification answer is selected from the segmented verification code;
delete stored verification code identifier, which is carried in the result, in a case that the verification answer in the result passes the verification;
query an image group corresponding to the verification code according to the verification code identifier and run statistics on the image group;
delete the image group in a case that a verification pass ratio of the verification code generated from the image group is smaller than a predetermined pass ratio; and
delete the image group in a case that a usage count of the verification code generated from the image group is larger than a predetermined count.

6. The apparatus according to claim 5, wherein the program instructions further configure the system to:
randomly select images from a set of images associated with a same verification question to generate the a plurality of image groups, and perform image processing in a first processing manner on images in the plurality of image groups,
wherein the number of times the images are changed in processing the images by the first processing manner is larger than the number of times the images are changed in processing the images by the second processing manner.

7. The apparatus according to claim 6, wherein each of the plurality of image groups comprises a preset quantity of images serving as correct answer to the verification question.

8. The apparatus according to claim 6, wherein the first processing manner or the second processing manner comprises at least one of adding interference lines, adding interference points, adding interference polygons, changing colors, changing a contrast, rotating an image, stretching an image, twisting an image, cutting an image, blocking an image and performing a perspective transformation on an image.

9. A verification system comprising a terminal and a server, wherein:
   the server is configured to randomly select an image group from a plurality of image groups generated in advance, wherein images in the image groups are associated with a same verification question, generate a verification code by merging the images in the selected image group in a preset merging manner and performing image processing in a second processing manner on the merged image, send the verification code and the verification question associated with the image group to the terminal, receive a result returned by the terminal and perform a verification based on the result, and
   the terminal is configured to perform a segmentation on the verification code, display the segmented verification code and the verification question, receive a verification answer selected based on the segmented verification code, generate a result based on the verification answer and return the result to the server;
   wherein the server is further configured to delete a stored verification code identifier, which is carried in the result, in a case that the verification answer in the result passes the verification;
   the server is further configured to query an image group corresponding to the verification code according to the verification code identifier and running statistics on the image group,
   delete the image group in a case that a verification pass ratio of the verification code generated from the image group is smaller than a predetermined pass ratio, and
   delete the image group in a case that a usage count of the verification code generated from the image group is larger than a predetermined count.

10. The system according to claim 9, wherein
   the server is further configured to randomly select images from a set of images associated with a same verification question to generate the a plurality of image groups, and perform image processing in a first processing manner on the images in the plurality of image groups,
   the number of times the images are changed in processing the images by the first processing manner is larger than the number of times the images are changed in processing the images by the second processing manner.

11. The system according to claim 10, wherein each of the plurality of image groups comprises a preset quantity of images serving as correct answer to the verification question.

12. The system according to claim 9, wherein the first processing manner or the second processing manner comprises at least one of adding interference lines, adding interference points, adding interference polygons, changing colors, changing a contrast, rotating an image, stretching an image, twisting an image, cutting an image, blocking an image and performing a perspective transformation on an image.

* * * * *